April 12, 1927.
M. E. BIGELOW
1,624,464
MOTIVE FLUID GENERATOR
Filed July 14, 1920
11 Sheets-Sheet 1
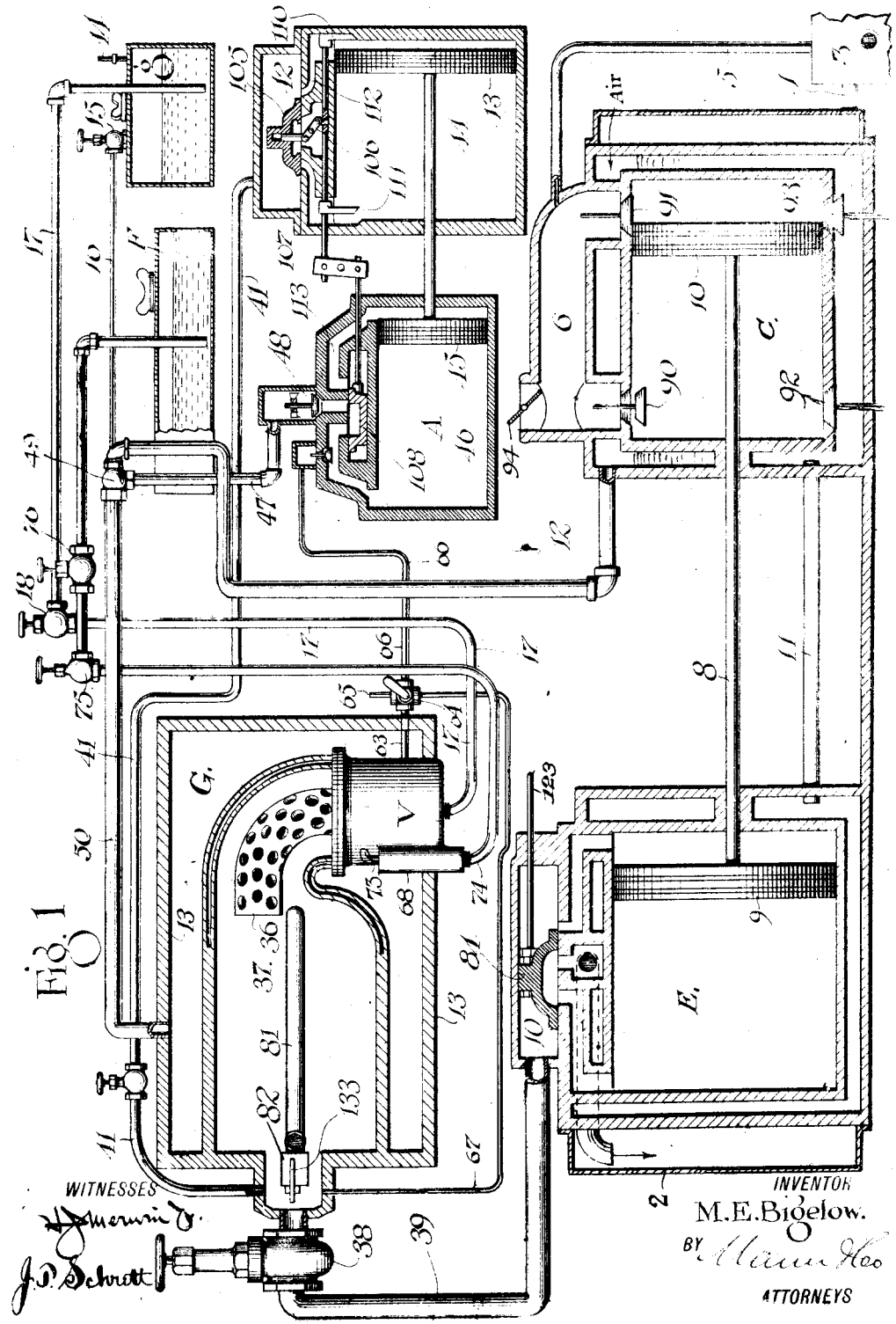

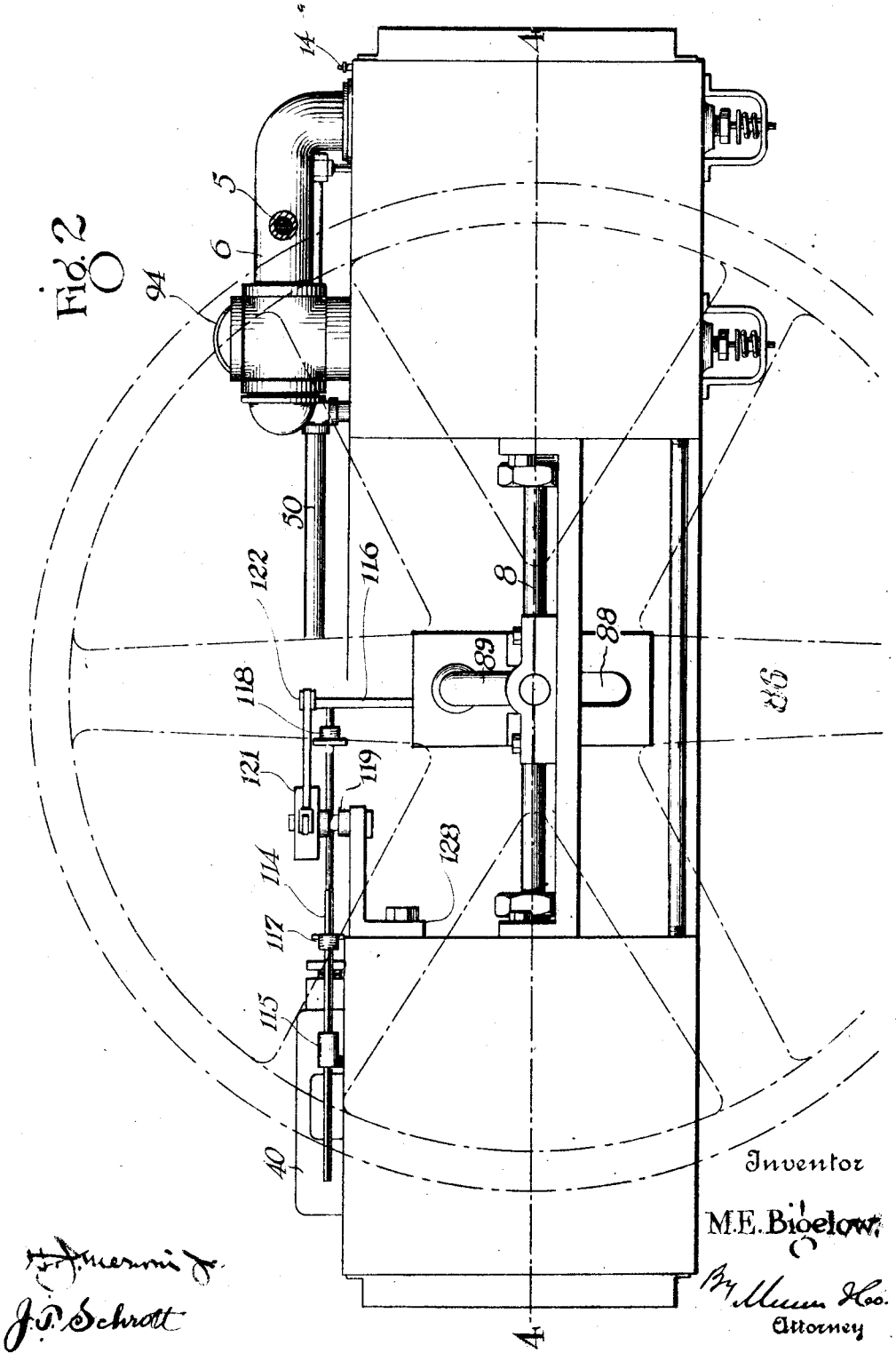

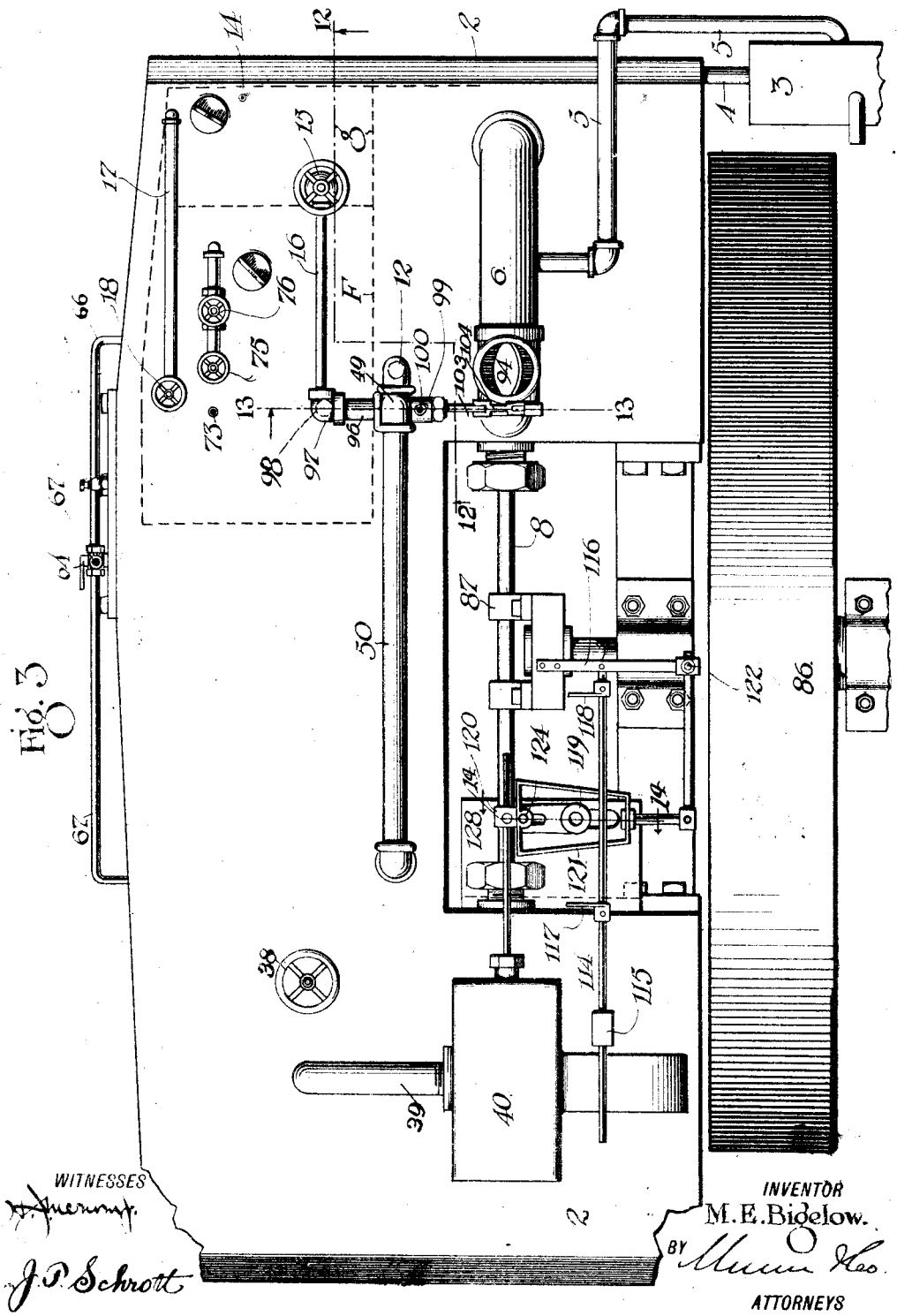

April 12, 1927.
M. E. BIGELOW
MOTIVE FLUID GENERATOR
Filed July 14, 1920    11 Sheets-Sheet 4
1,624,464
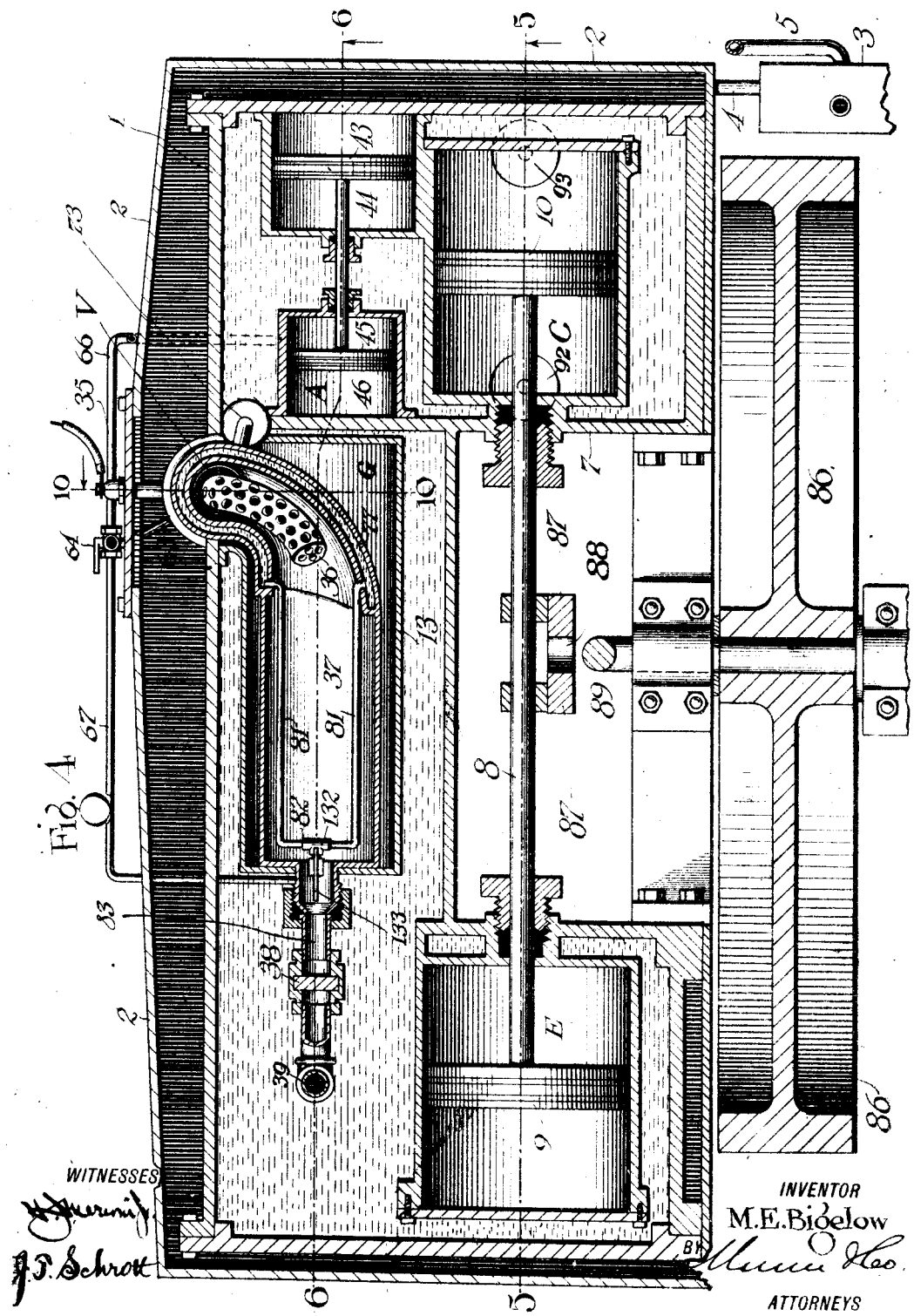
WITNESSES
INVENTOR
M. E. Bigelow
ATTORNEYS

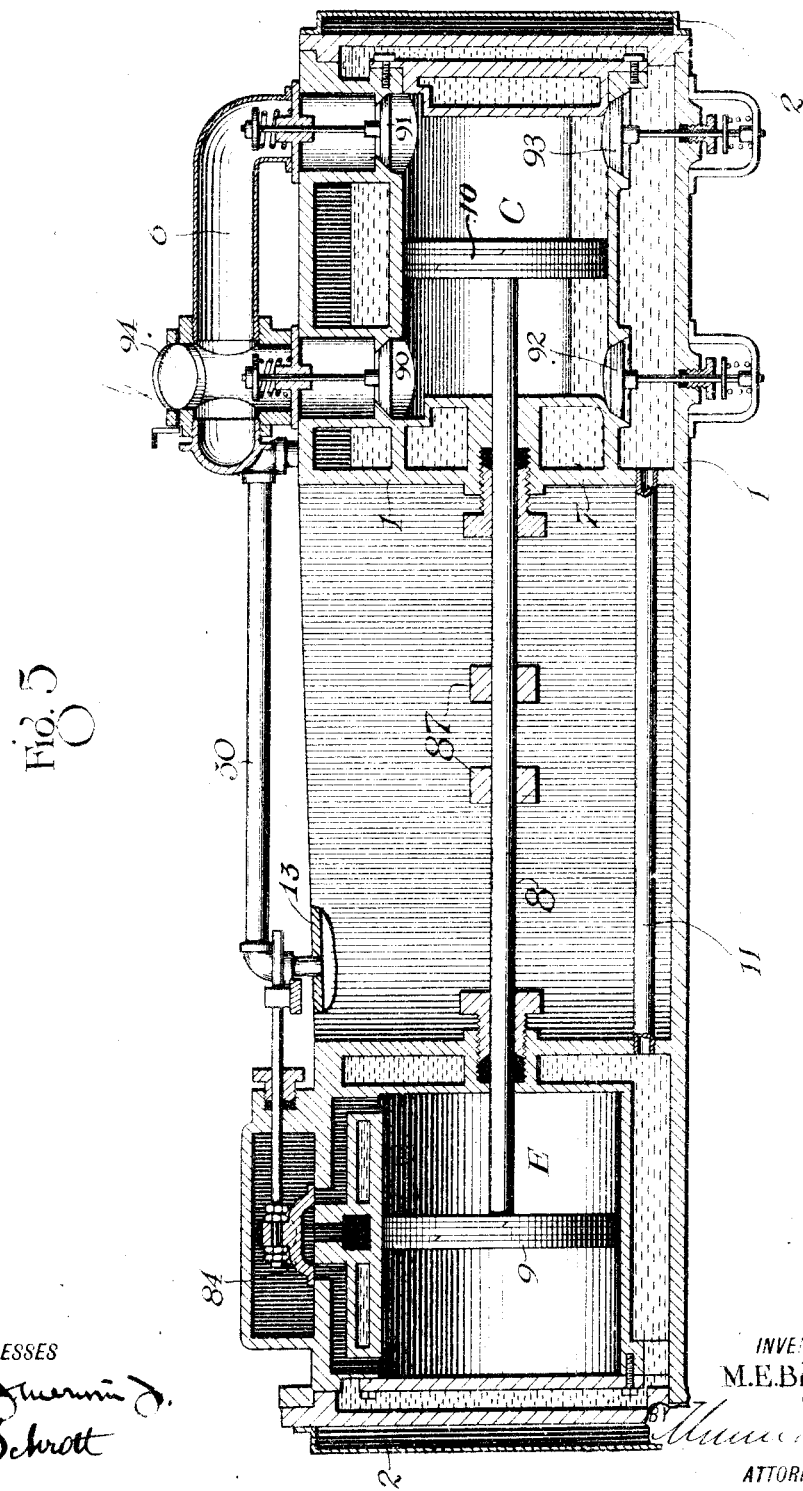

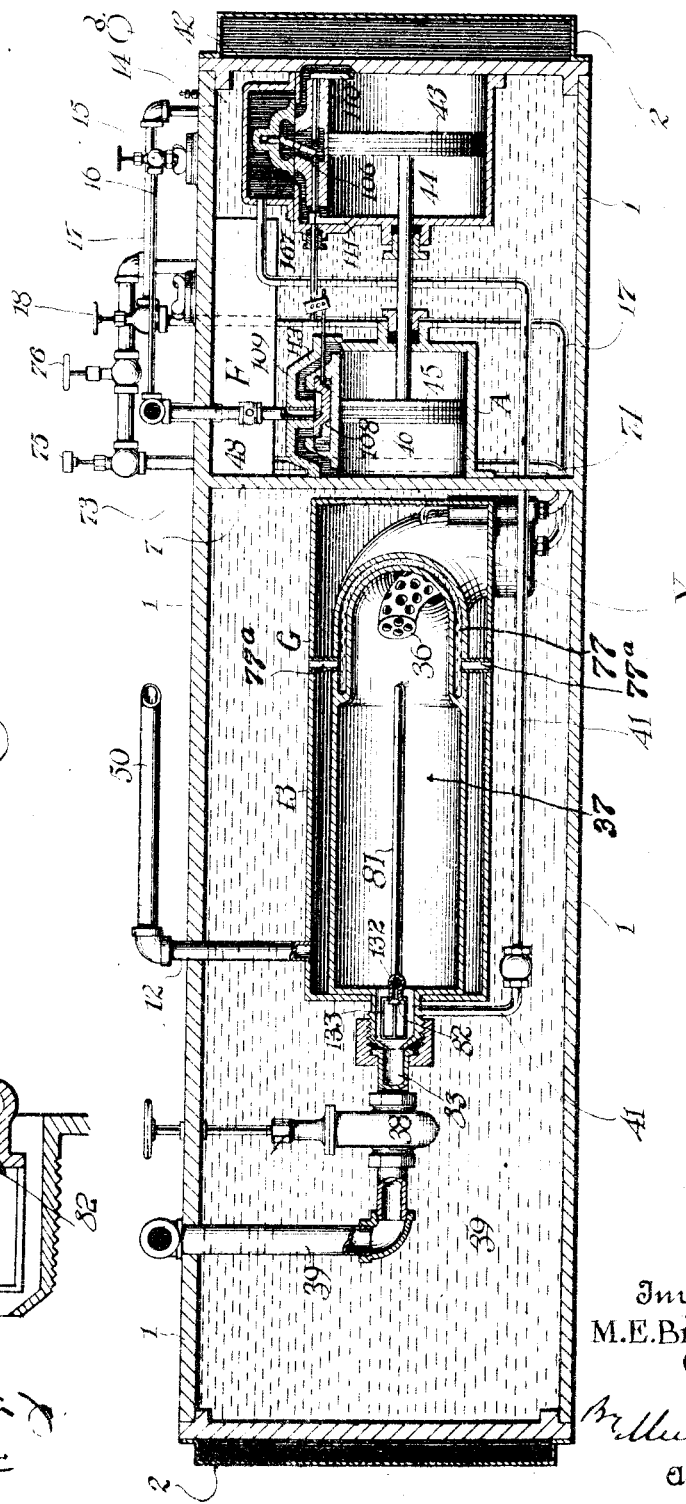
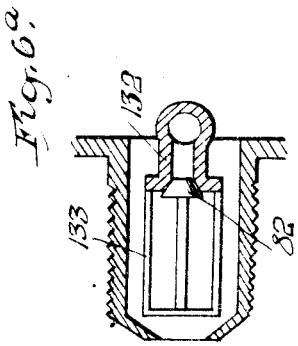

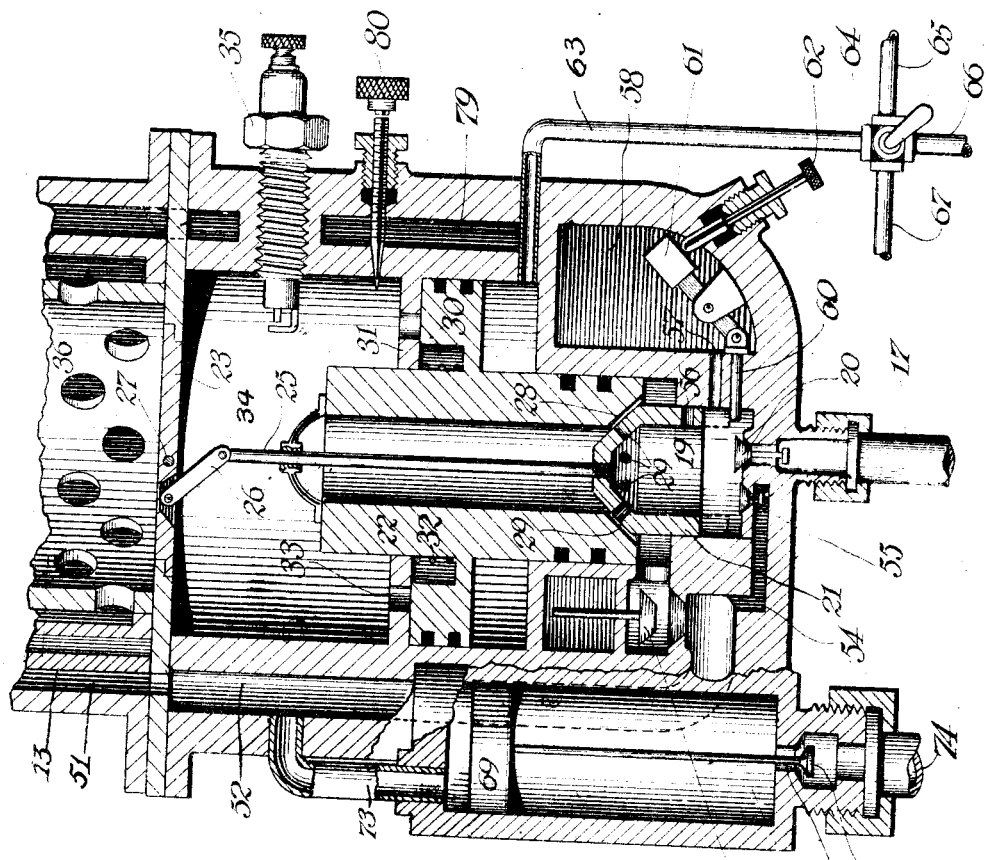
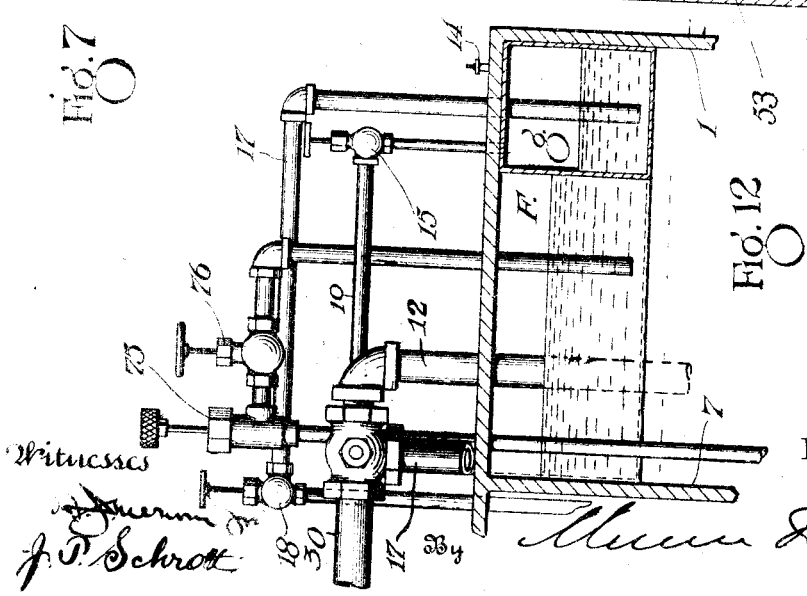

April 12, 1927.
M. E. BIGELOW
MOTIVE FLUID GENERATOR
Filed July 14, 1920
1,624,464
11 Sheets-Sheet 8
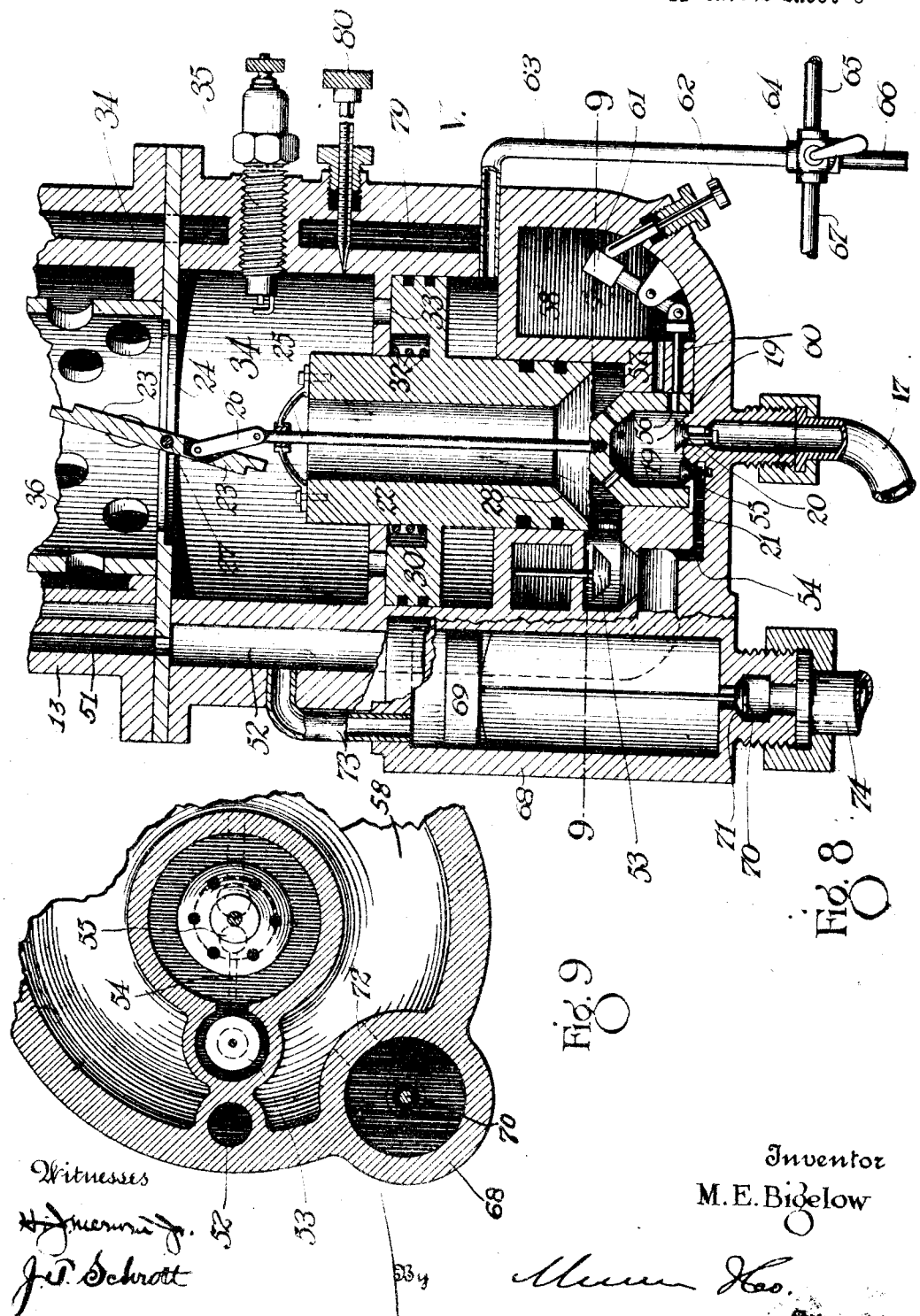
Witnesses
Inventor
M. E. Bigelow
By
Attorney

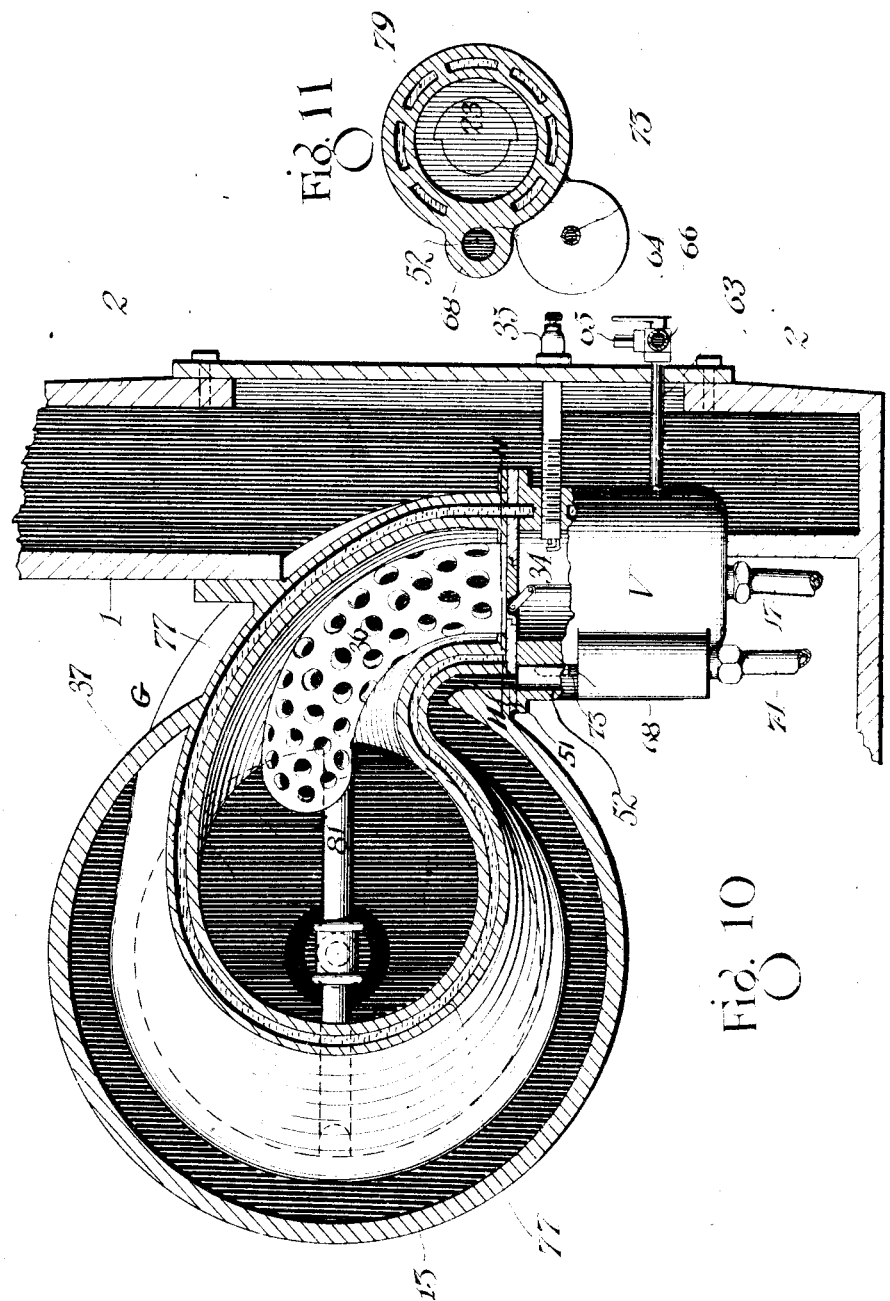

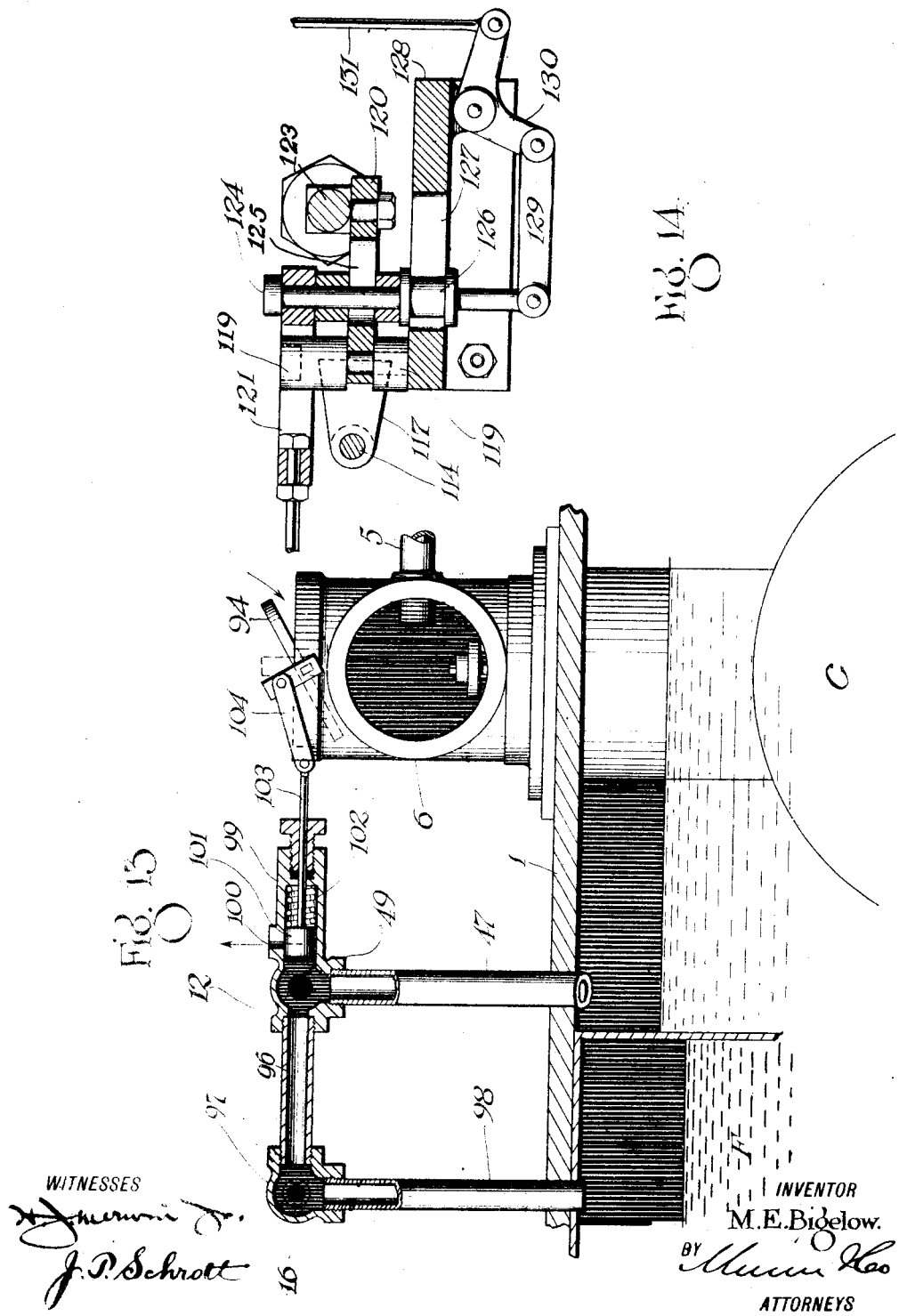

April 12, 1927.
M. E. BIGELOW
MOTIVE FLUID GENERATOR
Filed July 14, 1920
1,624,464
11 Sheets-Sheet 11
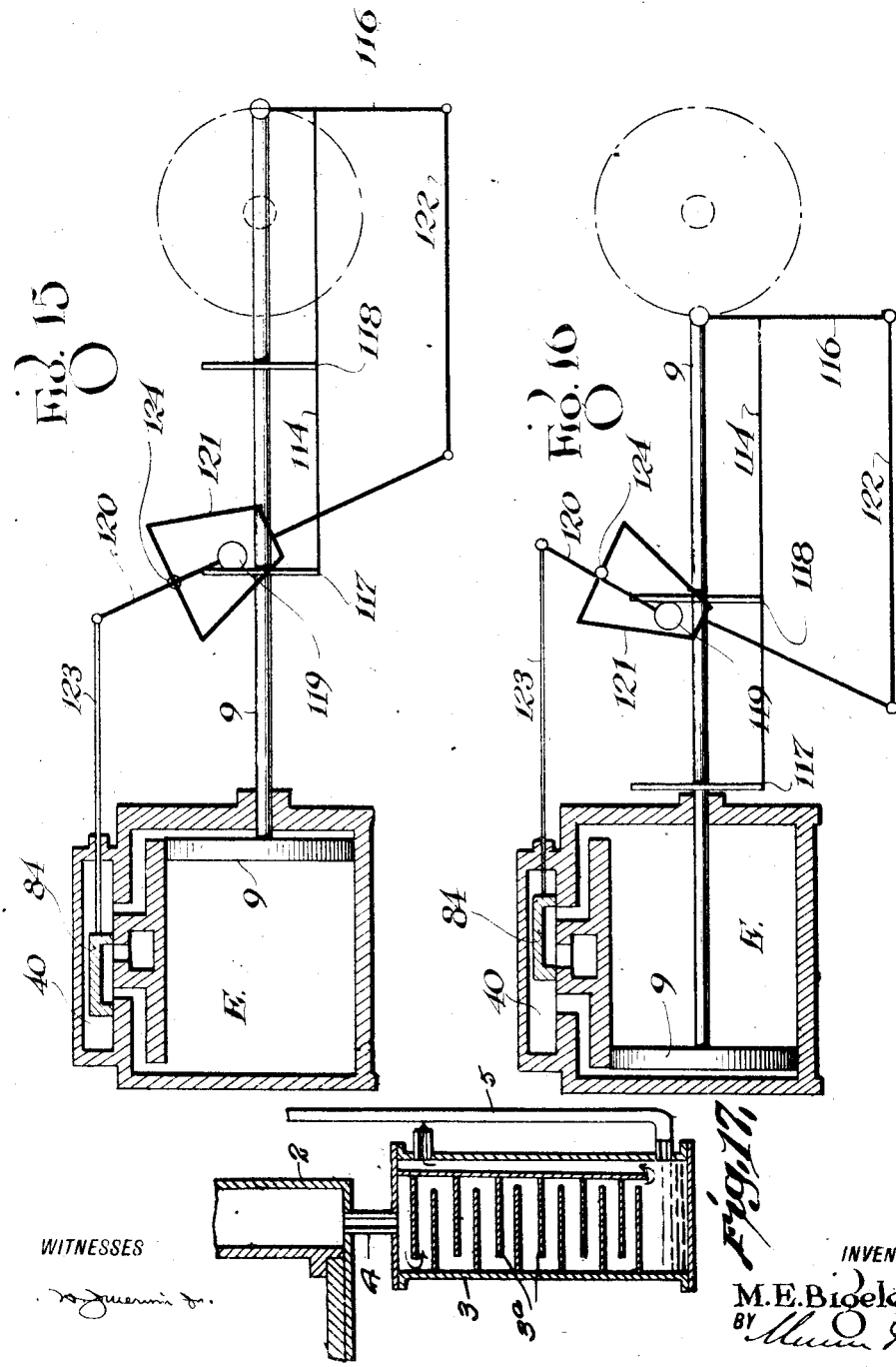

Patented Apr. 12, 1927.

1,624,464

UNITED STATES PATENT OFFICE.

MILTON EUGENE BIGELOW, OF WARREN, ARIZONA.

MOTIVE-FLUID GENERATOR.

Application filed July 14, 1920. Serial No. 396,167.

My invention relates to improvements in thermo-dynamic generators, and it consists in the constructions, combinations and arrangements herein described and claimed.

One of the foremost objects of the invention is to provide a heat generator and engine for utilizing the heat, both being so combined as to constitute an engine unit as a whole, the principles of both the steam and internal combustion engine being so embodied as to result in a rigid economy of fuel, the reason for this economy being largely attributed to the steps taken in preventing the premature escape of the heat before full utilization.

A further object of the invention is to provide a heat generator and engine, the two being preferably constructed in combination, so as to constitute a unit, there being a water jacket around the whole generator and engine structures and an exhaust gas jacket around the major portion of the water jacket, both latter arrangements serving to prevent the premature loss of valuable heat.

A further object of the invention is to provide an improved motive fluid generator with an operatively associated engine for utilizing the energy converted thereby, said generator producing a motive fluid which consists partly of steam which is produced by water injected from a water jacket, and heated gases which are produced by a continuous flame from fuel burning mechanism.

A further object of the invention is to provide a complete engine unit of the character above described, including various novel actuating and control mechanisms, all of which are described in regular order below.

Other objects and advantages will appear in the following specification, reference being had to the accompanying drawings, in which:—

Figure 1 is a diagram illustrating the relative arrangement of the various operating elements of an engine unit constructed in accordance with my invention.

Figure 2 is a side elevation of the engine unit, the fly wheel of which is removed for the purpose of disclosing the structure, being indicated in dot and dash lines.

Figure 3 is a plan view of the improved generator-engine unit.

Figure 4 is a horizontal section taken substantially on the line 4—4 of Figure 2, Figure 5 is a longitudinal section taken on the line 5—5 of Figure 4, illustrating the main engine and compressor cylinders, Figure 6 is a longitudinal section on the line 6—6 of Figure 4 illustrating a part of the motive fluid generator and the auxiliary compressor mechanism, Figure 6ª is a detail sectional view of the temperature control valve 8ª, Figure 7 is a detail section of the fuel valve mechanism with the parts in the normal or priming position, Figure 8 is a similar view of the fuel valve mechanism showing the parts in the positions when the motive fluid generator is in operation, Figure 9 is a detail horizontal section on the line 9—9 of Figure 8, Figure 10 is a detail cross section on the line 10—10 of Figure 4, more clearly illustrating the application of the fuel valve mechanism to the motive fluid generator, Figure 11 is a detail horizontal section taken on the line 11—11 of Figure 10, illustrating how the fuel valve is water jacketed, Figure 12 is a detail section taken on the line 12—12 of Figure 3, illustrating the valve mechanism associated with the pressure gasoline and fuel tanks, Figure 13 is a detail section on the line 13—13 of Figure 3, illustrating the automatic control for the air throttle valve, Figure 14 is a detail cross section on the line 14—14 of Figure 3, illustrating parts of the actuating mechanism of the main cylinder slide valve, Figures 15 and 16 are diagrams illustrating the actuating mechanism for the main cylinder slide valve in the different positions referred to below, and Fig. 17 is a detail sectional view of a conventional separator which may be used with the generator.

The general construction of the invention comprises the motive fluid generator G, which produces the motive fluid, and the engine, consisting of the main cylinder E and main air compressor cylinder C which utilizes the motive fluid from the generator. Working in conjunction with the generator G is the fuel valve mechanism V, illustrated in detail in Figures 7 and 8, an auxiliary air compressor A, a fuel reservoir F and a priming fluid or gasoline reservoir g.

All of the foregoing elements are preferably housed in one casing 1, which contains water for the purpose of surrounding said elements with a heat conducting medium and providing a water supply for the motive fluid generator G, the major portion of the casing 1 being enclosed in a housing 2 into which the exhaust gases from the main cylinder E are discharged before they are conducted through the separator 3 by the pipe 4. The separator operates to separate the moisture from the permanent gases, the latter escaping to atmosphere, and the former being conducted by the pipe 5 to the intake manifold 6 of the air compressor C.

A detail of the separator is shown in Fig. 17. This is merely a conventional showing, and it is to be understood that any other, and possibly more suitable, type may be used in actual practice. The passage of the exhaust gas is interrupted by a plurality of baffles 3* which are so arranged as to provide a tortuous path, giving ample opportunity for the condensation of the moisture content of the gas. The moisture collects at the bottom whence it is conducted by pipe 5 to the manifold 6 as stated.

A partition 7 divides the water chamber 1, as illustrated in Figure 4, the generator G and main cylinder E being suitably located on one side, the auxiliary compressor A, main compressor cylinder C, fuel and priming reservoirs F and g being suitably located on the other. A common piston rod 8 connects the pistons 9 and 10 of the cylinders E and C respectively, so that the air compressor is operated by the engine, and both air in relatively large quantities, and water, received from the separator 3 in relatively small quantities, is forced into the chamber at the right of the partition 7.

Naturally the compressed air rises to the top of this chamber, as indicated in Figures 1 and 5, the water flowing into the left chamber through the pipe 11, while the compressed air flows through pipe 12 into the air jacket 13 of the generator G. In order to enable the reader to quickly understand the details of construction of the remaining mechanism, and at the same time the mode of operation, the various elements above referred to are described in detail below in the order in which they come into play. Therefore, attention is first directed to the gasoline reservoir g (Fig. 1), which is so located as to enable access from the outside to the valve 14. It should be assumed that the whole engine is dormant, with all pressure on the inside no greater than that of the atmosphere. The gasoline in the reservoir g is initially put under pressure by pumping air in at the valve 14 with an ordinary bicycle pump.

The valve 15 must first be closed. This valve is located in the pipe 16 which later on in the operation supplies air to the reservoir g and keeps the gasoline under sufficiently high pressure to insure its conveyance to the fuel valve mechanism V, through the pipe 17. Up to this time, however, the valve 15 is still closed because there is no pressure in the pipe 16 to carry out the purpose just mentioned. The valve 18 in the pipe 17 must be opened to let the gasoline, now under pressure, flow into the pocket 19 of the valve V which it does by raising the check valve 20 (Fig. 8). The pocket 19 soon becomes filled and causes the dome valve 21 and piston valve 22 to rise, the latter normally resting on the dome valve 21, thereby revolving the butterfly valve 23 to close the passage 24 (Fig. 7). Rod and link connections 25, 26 accomplish the movement just referred to. The valve 23 is pivoted off center at 27 in the aperture 24 to make the valve heavier on the right side and facilitate the closing movement.

The dome valve 21 soon reaches the limit of its upward movement by virtue of the pressure of gasoline and air beneath it when the butterfly valve 23 is completely closed in the aperture 24, and it is then that the continued pressure exerts itself on the frusto-conical seat 28 of the piston 22 through the spray apertures 29 of the valve 21, forcing the piston 22 up a little further until the piston 30 engages and is stopped by the partition 31. The piston 30 is moved against the tension of a relatively light spring 32. Openings 33 in the partition 31 prevent the retardation of movement of the piston 30 by air which would be compressed between it and the partition, were the openings not provided.

Since there is now a slight space between the dome valve 21 and the frustro-conical seat 28 of the valve 22, gasoline under air pressure now sprays upwardly into the ignition chamber 34 of the valve V, where it is ignited by a spark from the plug 35. An explosion occurs. The valve 22 is driven downwardly by virtue of the explosion pressure against the piston 30 through the opening 33. The dome valve 21 is carried downwardly with the valve 22. The downward movement of the valve 21 aids in counter-rotating the butterfly valve 23 on its fulcrum 27, so that the passage 24 is opened by the combined influences of the movement of the valve 21 and the force of the explosion thereagainst from the other side.

A relatively large flame now shoots out of the ignition chamber 34 into the perforated hot tube 36 (Figs. 1 and 10) which curves into the combustion chamber 37 of the motive fluid generator G, the flame emitted from the hot tube 36 having a torch-like appearance. The main valve 38 (Fig. 1) in the pipe 39 which leads from the generator G to the valve chest 40 of the main engine cylinder E is closed so that the products of combustion in the combustion chamber 37 enter the pipe 41, flowing therethrough to the valve chest 42 and causing the operation of the piston 43 in the working cylinder 44 of the auxiliary air compressor A. In practice the valve chest 42 will have a suitable exhaust opening to atmosphere as is usual.

A few initial strokes of the piston 45 in the air cylinder 46 of the auxiliary air compressor mechanism, drive compressed air through the pipe 47 and back check valve 48, into the four-way union 49, through the main air supply pipe 50, into the air jacket 13; already described.

There is a duct 51 which leads from the jacket 13 into the bore 52 in the wall of the fuel valve V. The duct is shown in Figures 10 and 11, while the bore is shown for example in Figure 8. The air pressure in the bore 52 must be presumed to be great enough to lift the valve 53 in Figure 8, a part of the air under pressure entering a minute passage 54, lifting the small valve 55 so that the ultimate result is the second lifting of the piston valve 22 to the uppermost position illustrated, in which it remains during the rest of the operation.

Combustion is now fully established in the chamber 37 and compressed air is being supplied via jacket 13, duct 51, and bore 52 in a sufficient quantity to support the combustion of the heavier fuel oil in the valve V. But before describing the operation relating to the introduction of the fuel oil, several details of construction of the valve V must be understood by the reader.

Initially, the port 56 in the dome valve 21 is out of registration with the port 57 which leads from the oil well 58 to the pocket 19 inside of the valve. When the valve 21 is lifted by virtue of the initial gasoline and air pressure, the port 56 passes the port 57 so that no heavy oil flows into the pocket. The valve 21 must not be permitted to drop back to the lowermost position when the initial explosion occurs in the ignition chamber 34 at which time the butterfly valve 23 opens as explained above, because communication between the pocket 19 and the oil well 58 will be cut off and no fuel oil could flow in.

Therefore, a pin 60, pivotally connected to pivoted counter-weighted lever 61 moves beneath the valve 21 when it rises thereabove, and provides a stop for the valve on its return movement. The ports 56, 57 are then in registration so that heavy oil flows in to be subsequently finely sprayed at the opening 29, and ignited in the chamber 34 as appears below.

A push button 62, accessible from the outside, enables releasing the pin 60 from the dome valve 21 so that the latter may resume its initial position when desired. A small pipe 63 leads from the chamber beneath the piston 20 to a two-way valve 64, from which pipes 65, 66 and 67 branch. These lead to atmosphere, the air intake of the auxiliary compressor A, and to the gas generator G, respectively. The two-way valve 64 is for the purpose of maintaining a greater pressure in the air chamber than in the combustion chamber, a detailed description being given below.

The float chamber 68, located at one side of the fuel valve V, contains a float 69 with a valve 70 to close the fuel inlet 71 when the proper level of fuel in the chamber 68 is reached. This float also prevents fuel overflowing into the duct 52 via the pipe 73. The fuel oil flows from the chamber 68 into the well 58 through the passage 72 (Fig. 9). A breather pipe 73 permits the egress and ingress of compressed air from bore 52 to the chamber 68 above the float 69 so that the movements of the latter may not be retarded, air in the bore 52 being received from the jacket 13 by way of the duct 51 (Fig. 10). The fuel pipe 74 leads from the coupling beneath the valve 70 to the fuel tank F, needle and globe valves 75 and 76 being interposed.

Structural details of the motive fluid generator G comprises a double-walled or water-jacketed portion 77, the structure of which is well shown in Figures 4 and 10. The water jacket 77 assumes a grid-like formation adjacent to the flange 78 to which the fuel valve V is suitably secured. The fuel valve is water-jacketed at 79 a part of the way down, adjustable quantities of water being capable of induction into the ignition chamber 34 by regulating the needle valve 80 in the wall of the fuel valve.

Two or more pipes 81 lead from the water jacket 77 in the combustion chamber 37 to the temperature-regulating valve 82, through which steam is discharged into the mixing chamber 83 between the valve and combustion chamber outlets. The intense heat inside of the combustion chamber converts the water conducted from the water jacket 77 into the pipe 81, into steam which, as stated, is discharged into the chamber 83, where it mixes with the products of combustion and thus creates the motive fluid which later operates the main engine cylinder E.

Now resume the description of the operation after the initial explosion in the ignition chamber 34 of the valve V, and the creation of sufficient compressed air in the bore 52 to raise the valves 53 and 22. The dome valve 21 rests on the pin 60 so that the ports 56 and 57 are in registration and heavy fuel oil flows from the well 58 into the pocket 19. The valve 18 in the gasoline pipe 17 should now be closed. Valve 20 beneath the pocket 19, closes under the combined influences of gravity and pressure inside of the pocket.

The heavy fuel oil is vaporized by being sprayed out of the apertures 29 and through the hollow piston valve 22, becoming volatilized by contact with the hot surrounding parts and thereafter flaming through the hot tube 36 into the combustion chamber 37, in the same manner that the initial charge of gasoline flamed in. Continuous combustion takes place in the chamber 37, such combustion being aided by a continuous spark from the plug 35. It is now time to open the globe valve 76 and the needle valve 75, whereupon oil from the fuel reservoir F flows under pressure through the pipe 74, chamber 68 and passage 72 into the well 58, thus establishing a continuous flow of the oil into the pocket 19, into which it was initially started, as already explained.

The main engine cylinder E commences to operate when the main valve 38 in the pipe 39 is opened so that the generated motive fluid may flow into the valve chest 40 where the slide or D valve 84 controls the admission thereof to the ports 85 which lead to the extremities of the engine cylinder. The reciprocating movements of the piston 9 are converted into the rotary movements of the fly wheel 86 by the frame 87 on the connecting-rod 8, which has a vertical slot 88 occupied by the pin end of the fly wheel crank 89. It is the main air compressor C, which keeps up the circulation of the water, and provides the compressed air necessary for the continued operation of the motive fluid generator G. Valves 90, 91, 92 and 93 control openings in the main compressor cylinder. The upper two communicate with the manifold 6, while the lower two communicate with the water space in the main casing 1 at the right of the partition 7. The throttle valve 94 controls the admittance of atmospheric air into the manifold 6, into which manifold water is also conducted by the return pipe 5 from the condenser 3 under the influence of the suction in the manifold 6.

A stroke of the compressor piston 10 to the right, for example, causes the opening of the valves 90 and 93, the former letting in a charge of air and water, the latter enabling egress of a previously admitted charge of air and water into the water space of the casing 1. As explained before, the compressed air rises toward the top whence it passes through the pipe 12 into the common connection 49, into the main air supply pipe 50, jacket 13, duct 51, bore 52 and so on around into the combustion chamber 37, supporting the combustion of the fuel oil.

A part of the compressed air flows from the connection 49 through the pipe 96, elbow 97 and pipe 98 into the fuel reservoir F, thereby keeping the fuel under continuous pressure. The pipe 16 joins the elbow 97, but no compressed air flows into the gasoline reservoir g because the valve 15 is intended to be now closed. At such a time when the engine is to be subsequently started, the valve 15 is opened to admit compressed air to the gasoline reservoir, there now being sufficient compressed air in the system to perform the priming operation, it being unnecessary to first place the gasoline under compression by applying the bicycle pump at the valve 14 as as was the case in the beginning.

Should the air pressure in the system become too great, the mechanism in Figure 13 automatically comes into operation. The common connection 49 has a chambered extension 99 with a vent 100, in which extension the piston 101, normally pressed inwardly by the spring 102, is located. The stem 103 of the piston joins the link 104, which in turn is connected to the throttle 94. An increase of pressure above a predetermined amount will force the piston 101 outwardly in respect to the connection 49, so that the throttle 94 is rocked toward a closed position. Further movement of the piston 101 establishes communication of the inside of the connection 49 with the atmosphere so that enough of the excess pressure can escape to restore the system pressure to that which it ought to be.

Two slide valve operating mechanisms remain to be described, namely, that of the auxiliary compressor mechanism A and of the main engine cylinder E. The slide valve 105 in the chest 42 of the cylinder 44 in Figure 6 is actuated by a rocker 106 and the rod 107, which is common to both the valves 105 and 108 in the chest 109 of the air cylinder 46.

As the piston 43 reaches the extremities of its strokes, one or the other of the stops 110 and 111 are engaged and moved with the piston a short distance. This results in the shifting of the rocker 106 so that the valve 105 is slid over the ports 112 in the proper manner to admit a new charge and permit the expulsion of the spent charge. This intermittent reciprocatory movement of the rod 107 causes the proper actuation of the slide valve 108, so that charges of compressed air are permitted to flow out of the ports 113, through pipe 47 to the air jacket 13, as described in connection with the initial operation of the engine.

Now as to the mechanism for operating the slide valve 84 in the chest 40: A slide rod 114, supported in a suitable bearing 115 at one end and suitably secured at the other end to an arm 116 which is affixed to and extends from the frame 87, carries abutment plates 117, 118 for the purpose of engaging the roller 119 of the valve shifter 120 only at the extremities of the strokes of the frame 87. The valve 84 is therefore not shifted until a piston stroke in either direction is almost completed, and when the valve is shifted, a full port opening is presented so that the motive fluid in its full force is admitted to the cylinder E and thrust against the piston 9. This is shown in Figure 15.

The inflow of the motive fluid is however quickly shut off again by means of the open frame 121, which is linked at 122 to the extension 116, and operates to overtake the roller 119, move the valve rod 123 in the reverse direction and thus cut off the inflow of fluid, as just stated. Reference is directed to Figures 15 and 16, which when considered with the above description, make it clear how the shifting of the slide valve 84 takes place through the medium of the means described.

A bolt 124 is the common fulcrum for the valve shifter 120 and the open frame 121. The roller 119 of the shifter 120 occupies the opening in the frame 121. The slot 125 in the shifter 120 is occupied by the bolt 124, and the bolt in turn is carried by a block 126 which is adjustable in the slot 127 of a fixed bracket 128, by means of the link, bell crank and rod connections 129, 130 and 131. By shifting the fulcrum of the valve shifter 120 the length of movement of the valve 84 may be adjusted, it being obvious that the nearer the bolt 124 is to the rod 123, the less will be the movement of the valve 84.

The operation may be reviewed to advantage, but this review is very brief because the operation is fully set forth in connection with the description of the construction above. Consider Figure 1. All of the valves shown are closed but the reader must now imagine that there is air under compression in the system, remaining from a previous operation of the engine. The valves 21 and 22 in Figure 8, are in their initial lowermost position, the valve 21 having been released by means of the button 62, and the butterfly valve 23 is closed in the passage 24.

Now open valves 15 and 18 in Figure 1. Air under pressure flows from the space above the water in the compartment at the right of the partition 7, through pipe 47 (see Fig. 13) to the common connection 49 and pipes 96 and 16 to the gasoline reservoir g. From thence, through pipe 17, valve 18 and valve 20 in Figure 8, into the pocket 19, raising the dome valve 21 and piston valve 22 together by virtue of the pressure. This lifting movement closes the butterfly valve 23, and since the piston valve 22 has a slightly farther distance to go than the valve 21, a space between the two is produced through which the gasoline under pressure sprays into the ignition chamber 34.

A spark ignites the charge, forcing the butterfly valve 23 open and the dome valve 21 down until it engages the pin 60, which is then in its path, also forcing the piston valve 22 down by virtue of the pressure exerted on the piston 30 through the aperture 33 in the partition 31. The ignited charge passes through the hot tube 36 into the combustion chamber 37, out of the pipe 41 into the valve chest 42 of the auxiliary compressor mechanism A, causing the operation of that mechanism and the creation of additional compressed air in the cylinder 46.

This compressed air flows through the pipe 47 and back check valve 48 into the air jacket 13 around the combustion chamber 37, enters the duct 51 in Figure 10 and bore 52 in the fuel valve G so that valves 53 and 55 are lifted, permitting the compressed air in turn to again lift the piston valve 22 in readiness for operation when the fuel oil flows in under pressure.

The operator now opens the valves 75 and 76, whereupon fuel from the reservoir F flows into the float chamber 68 (Fig. 8) through pipe 74 and so on into the ignition chamber 34, where it burns and produces an extremely hot flame in the combustion chamber 37. Water from the jacket 77, partially surrounding the combustion chamber 37, escapes in the form of steam at the temperature regulating valve 82 of the pipe 81, commingling with the products of combustion in the mixing chamber 83, and thereafter flowing through the pipe 39 and valve 38, which is now opened, into the valve chest 40 of the main engine cylinder E.

Water may be supplied to the jacket 77 in any convenient way, one mode consisting of providing at least two pipes 77ª (Fig. 6) leading from the casing 1. These pipes permit a circulation of water.

The piston 9 in this cylinder, is operated in the manner which the reader now fully understands, the exhaust gas being discharged into the gas jacket 2, thence flowing into the condenser 3 via pipe 4 in Figure 4, the permanent gases escaping to atmosphere while the moisture is condensed and returned to the manifold 6 via the pipe 5. After the operation is once fully established, the main compressor mechanism C furnishes the necessary compressed air for the combustion of the heavy fuel oil in the ignition chamber 34, and also keeps the water in the system for circulation.

The temperature control valve 82 (see Fig. 6ª), referred to before, is normally seated in the casing 132 and carried by a yoke structure 133 of metal having a coefficient of expansion different to that of the metal from which the casing 132 is made. In operation, the temperature control valve 82 opens by virtue of the expansion of the yoke 133 by the heat of the passing flame, and when thus opened, steam is permitted to escape from the pipe 31, as already fully set out above.

It has been stated in connection with the description of the valve 64 in Figure 8, that the purpose is to maintain a greater pressure in the compressed air chamber than in the combustion chamber. In accomplishing this purpose, the valve 22 is the primary factor, the two-way valve 64 merely being an auxiliary means by which the ultimate function is accomplished. The frusto-conical end 28 of the piston valve 22, is of considerably less area than the piston portion 30 of the valve, and it therefore requires a greater pressure of air against the portion 28 to lift the piston valve than is required against the piston portion 30 to lower the valve.

Ordinarily, there is a vacuum, or at least a partial vacuum, in the chamber beneath the piston portion 30, but in cases of necessity, as for example, priming, different degrees of pressure may be introduced into the lower portion of the chamber beneath the piston 30, thus requiring a lighter pressure to lift the piston valve 22. Varying degrees of pressure may be introduced beneath the piston 30 by properly manipulating the two-way valve 64.

There is also a feature of no small importance, which the reader must have in mind: Automatic control of the mechanism is effected by the cooperation of the piston valve 22 with the auxiliary compressor A. The principle on which this automatic control operates resides in the action of the fluid under pressure on pistons of different areas. One of such pistons consists of the valve 22, and the other of the piston of the auxiliary compressor.

If the air pressure closely approaches or falls below that of the combustion chamber, the auxiliary compressor is automatically brought into action and continues to operate until the air pressure is so much greater than the motive fluid pressure, that the motive fluid is unable to operate the mechanism, whereupon it automatically stops. It naturally follows that if the main compressor C is unable from any cause whatever (as for example when the mechanism is employed on an airplane at extremely high altitudes) to deliver sufficient compressed air, the auxiliary compressor A automatically comes to the rescue and aids the main compressor.

The advantages may also be briefly enumerated. It bears repetition that the fundamental principle of the invention lies in the motive fluid generator, or in other words, in the mechanism which produces the motive fluid. As an item of convenience, the engine E is combined with the motive fluid generator so as to constitute a single unit which is applicable to a wide variety of uses.

Such arrangement does not necessarily have to be adhered to, because the motive fluid generated may be used in other connections, that is to say, in any type of gas or air pressure engine. A distinctive characteristic of the engine unit consists of the complete jacketing of the engine parts with water, and then partially or wholly jacketing the water casing with an envelope of hot exhaust gas.

The purpose of these arrangements is to utilize as much of the heat as possible, the water envelope at the same time preventing such excessive heat in the generator that the metalic parts would burn out. Both the priming fluid and fuel reservoir are located well adjacent to hot parts of the engine so that by the time the fuel oil in particular, reaches the point of its destination, it is nearly in condition for use, being sufficiently hot to vaporize.

The requisites embrace the combustion chamber 37, the air compressor mechanisms A and C, the compressed air chamber at the right of the partition 7, the cooling system consisting of the water jacket, and the fuel feed consisting of the feed valve mechanism V. The water employed in the cooling system is used in generating steam, thus aiding in creating or rather converting the water into power. In order that steam is formed in proper proportions, the temperature control valve 82 is provided and brought into play automatically.

It is to be observed that the direction of movement of compressed air in the air jacket 13 in Figure 4, for example, as well as the water of the cooling system, is opposite to that of the movement of the flame in the combustion chamber 37. The purpose of this provision is to tend to retard the premature radiation of heat from the combustion chamber and engine. The generator, compressors, air tank, engine and other mechanisms may be built integrally in any combination or any number of combinations that necessity may call for. The relative positions of the various parts is also of little consequence, since any arrangement may be adopted in accordance with the dictates of preference or requirement.

While the construction and arrangement of the motive fluid generator engine unit as herein described and claimed, is that of a generally preferred form, obviously modifications and changes may be made without departing from the spirit of the invention or the scope of the claims.

I claim:—

1. A device of the character described comprising a generator for forming a motive fluid, an engine cylinder and valve mechanisms for controlling the flow of said fluid into the engine, the engine including a piston, an air compressor operated by the engine piston including an air and water intake manifold with valve mechanism leading into the compressor cylinder, means for automatically shifting the valve of the engine cylinder, a water jacket enveloping both cylinders and the motive fluid generator including a compartment into which the air compressor forces water and air in which they are separated for subsequent use in the motive fluid generator, an air jacket in communication with said water jacket to receive the compressed air, and a duct and bore respectively in the air jacket and generator establishing communication between the air jacket and the generator.

2. A device of the character described comprising a generator for forming a motive fluid, an engine cylinder with valve mechanisms for controlling the flow of said fluid thereinto, said cylinder having a piston, an air compressor operated by the engine piston, said compressor including a cylinder and an air and water intake manifold with valve mechanism leading into the compressor cylinder, means for automatically shifting the valve of the engine cylinder, a water jacket enveloping both cylinders and the motive fluid generator including a compartment into which the air compressor forces water and air in which they are separated for subsequent use in the motive fluid generator, a separator, a jacket substantially surrounding the water jacket for receiving the exhaust gases from the engine cylinder and conducting them to said separator which separates the permanent gas from the moisture, and means to return said moisture to said intake manifold.

3. A device of the character described comprising a motive fluid generator, means in operative combination therewith for initiating the formation of said motive fluid, comprising a reservoir with priming fluid under air pressure, a priming fluid connection, fuel feed mechanism to which said connection leads associated with the inlet of the combustion chamber and having an ignition chamber adjacent to said combustion chamber, a butterfly valve disposed at said ingress and being adapted to close said ignition chamber in the fuel feed mechanism, a dome valve having connection with the butterfly valve and being adapted to rise by pressure of fluid from said connection and close the butterfly valve to house a charge, and means for igniting the charge, the explosion moving the dome valve down and opening the butterfly valve to permit the flame to enter the combustion chamber.

4. The combination of a generator producing a motive fluid, an engine for utilizing the motive fluid, a source of liquid fuel for the generator, valve mechanism for controlling the flow of fuel to the generator, a water casing containing the generator, means to conduct water from the casing into the generator, and a housing around a part of the water casing to receive the exhaust gases from the engine.

5. A motive fluid generator comprising a tube having a mixing chamber at one end, means in said tube for directing a gas toward said mixing chamber, a water jacket forming part of said tube, a thermostatic valve adjacent to the mixing chamber, and a pipe leading from the water jacket through the gas to the thermostatic valve adapted to discharge steam, generated by the heat of said gas, into the mixing chamber when the thermostatic valve opens.

6. A motive fluid generator comprising a combustion chamber, having a mixing chamber at one end, a water jacket adjacent to the other end, a burner at the jacketed end of the chamber, a water pipe situated entirely in the combustion chamber leading from the jacket through the chamber and terminating near the mixing chamber the water in the pipe being converted into steam by the heat of the burner gases, and a thermostatic valve supported by the pipe near the mixing chamber, said valve being adapted to open and admit steam from the pipe into the mixing chamber to mingle with the burner gases.

7. A motive fluid generator comprising a combustion chamber, with a mixing chamber at one end, a burner at the other end, a water jacket in the part of the combustion chamber surrounding the burner, a thermostatic valve located adjacent to the mixing chamber comprising a casing and a yoke structure by which the valve is supported on the casing, said yoke structure having a coefficient of expansion different from that of the casing, and a pipe situated entirely in the combustion chamber leading from the water jacket to the valve casing and furnishing the support for the thermostatic valve, the water in said pipe being converted into steam by the heat of the burner gases and discharging into the mixing chamber upon opening of the valve.

8. The combination of a casing containing water, an air compressor situated in the casing, an air intake manifold, communicating valves between the manifold and compressor, communicating valves between the compressor and casing, and means for discharging water into the air manifold adapted to be forced into the casing with the air compressed by the compressor.

9. The combination of a casing containing water, a housing associated with the casing adapted to receive moisture-laden exhaust gas, a separator adapted to receive the gas and precipitate the moisture, a compressor situated in the casing, an air intake manifold, separate valves respectively offering communication between the manifold and compressor and between the compressor and casing, and means for leading the water from the separator to the intake manifold to pass into the compressor and finally into the casing with the compressed air.

10. The combination of a casing, a partition dividing the casing, an engine on one side of the partition, an air compressor on the other side of the partition adapted to be operated by the engine, an intake manifold adapted to supply the compressor with both air and water to be forced into the casing at the adjacent side of the partition where the air collects at the top, and a pipe for leading the water to the other side of the partition to surround the engine and establish part of a circulatory system.

11. The combination of a generator for producing a motive fluid, an engine for utilizing the fluid, valve mechanism furnishing the generator with fuel, a casing enclosing the foregoing elements and including a partition at one side of which they are located, a pump situated on the other side of the partition operated by the engine, a manifold by which the compressor is supplied with both air and water to be forced into the casing at the adjacent side of the partition in which the air collects at the top, means for conducting the air to the valve mechanism, and means for conducting the water to the other side of the partition to surround the associated elements.

12. The combination of a generator for producing a motive fluid, valve mechanism furnishing the fuel, means for introducing steam as one of the constituents of the motive fluid, an engine to which said fluid is conducted, a housing into which the exhaust from the engine is discharged, a separator which receives the exhaust and separates the moisture from the non-condensible gas, an air compressor adapted to be operated by the engine, an air intake manifold for the compressor adapted to receive the water from the condenser, and a casing into which both the water and air are forced, said casing containing the generator, valve mechanism and engine to provide a heat-conducting medium, and means to conduct the air to the valve mechanism to supply one of the elements of the fuel furnished by the valve mechanism.

13. The combination of a motive fluid generator including a burner, an ignition chamber with which it communicates fuel feed mechanism therefor including a butterfly valve controlling communication between the two, a priming fluid reservoir furnishing fuel, means to put said fluid under pressure, means to conduct said fuel to said mechanism and cause the closure of said passage through the medium of the butterfly valve by virtue of the pressure, and means to ignite the fuel in said chamber.

14. The combination of a motive fluid generator including a burner, an ignition chamber with which it communicates fuel feed mechanism therefor including a butterfly valve controlling communication between the two, a dome valve having connection with the butterfly valve, a priming fluid reservoir furnishing fuel, means to put said fuel under pressure, means to conduct said fuel to said mechanism beneath the dome valve, the pressure of said fuel causing the closure of the passage by the butterfly valve, and means to ignite the fuel in said chamber.

15. The combination of a motive fluid generator including a burner, an ignition chamber with which it communicates fuel feed mechanism therefor including a butterfly valve controlling communication between the two, a dome valve defining a pocket, connections between the dome and butterfly valve, a priming fluid reservoir furnishing fuel, means to put the fuel under pressure, a pipe for conducting the fuel to said pocket, a check valve at the end of the pipe adapted to open to let the fuel into said pocket, raise the dome valve and move the butterfly valve to close said passage, and means to ignite the fuel in said chamber.

16. The combination of a motive fluid generator including a burner, fuel feed mechanism therefor, a dome valve in said mechanism adapted to define a pocket and having spray apertures, means adapted to rest on the dome valve and close said apertures, a priming fluid reservoir, means for putting the fluid under pressure, and means to conduct the priming fluid to said pocket, the pressure being adapted to move both the dome valve and closure means a predetermined distance then raise the closure means from said apertures to produce a priming fluid spray into said mechanism.

17. The combination of a motive fluid generator including a burner, fuel feed mechanism therefor including an ignition chamber, a dome valve in said mechanism defining a pocket and having spray apertures, a piston valve resting on the dome valve and closing said apertures, a priming fluid reservoir, means to impose pressure on said fluid, and means to conduct the fluid to said pocket the pressure thereof causing the dome valve to move a predetermined distance moving the piston valve with it then off of said apertures to carry a spray into said ignition chamber.

18. The combination of a motive fluid generator including a burner, fuel feed mechanism therefor having an ignition chamber, a butterfly valve controlling a communicating passage between the burner and said chamber, a dome valve defining a pocket and having spray apertures, connecting means between the dome and butterfly valves, a piston valve resting on the dome valve to close the apertures, a priming fluid reservoir, means to impose pressure on the fluid, a pipe leading the fluid to said pocket the pressure causing the dome valve and piston valve to raise until the butterfly valve closes the passage the continued pressure causing the lifting of the piston valve from said apertures and the carrying of a spray into the ignition chamber, and a back check valve at the end of the pipe adjacent to said pocket preventing the return flow of fluid.

19. The combination of a motive fluid generator including a burner, fuel feed mechanism therefor having an ignition chamber, a dome valve defining a pocket and having spray apertures, a piston valve resting on the dome valve and closing the apertures, means for conducting priming fluid under pressure to the pocket causing the simultaneous raising of the dome and piston valves, a butterfly valve controlling a passage between the ignition chamber and burner, and connecting means between the butterfly and dome valves the closure of the latter checking the movement of the dome valve, whereupon continued pressure raises the piston valve from said apertures permitting a priming fluid spray to enter the ignition chamber.

20. The combination of a motive fluid generator including a burner, fuel feed mechanism therefor having an ignition chamber, a dome valve defining a pocket and having spray apertures, a piston valve resting on the dome valve and closing the apertures, means for conducting priming fluid under pressure to the pocket causing the simultaneous raising of the dome and the piston valves, a butterfly valve controlling a passage between the ignition chamber and burner, connecting means between the butterfly and dome valves the closure of the latter checking the movement of the dome valve, whereupon continued pressure raises the piston valve from said apertures permitting a priming fluid spray to enter the ignition chamber, and means to ignite the spray in said chamber causing an explosion to simultaneously move the piston and dome valves in the reverse direction and the butterfly valve to open permitting the products of combustion to discharge at the burner.

21. The combination of a motive fluid generator including a burner, fuel feed mechanism therefor having an air duct, an air jacket around the generator in communication with said duct, means for introducing a priming charge into said mechanism for ignition at said burner to produce a hot gas in the generator, an engine adapted for primary operation by said gas, and a compressor adapted for primary operation by the engine to force air into said jacket to supply air to the fuel feed mechanism through said duct and support the combustion immediately following.

22. The combination of a motive fluid generator including a burner, an air jacket, fuel feed mechanism in communication with said jacket and with the burner, a butterfly valve controlling communication between the burner and fuel feed mechanism, a dome valve actuated by a priming fluid charge to close the butterfly valve, a piston valve which is adapted to be carried by the dome valve in said closing movement but which is also adapted to recede upon ignition of said charge to return the dome valve and open the butterfly valve, and means which is operated by the gas resulting from said ignition to furnish air under compression in said jacket for conveyance to the fuel feed mechanism to again raise the piston valve where it remains during a subsequent and predetermined period.

23. The sub-combination in a motive fluid generator comprising a burner, fuel feed mechanism therefor, means to supply a priming fluid under pressure, a valve which admits the priming fluid, a piston valve which is raised by the pressure of said priming fluid, means igniting the priming fluid the resulting explosion again lowering the piston valve, a source of compressed air, and a valve which is opened subsequently to the explosion, said compressed air returning the piston valve to the former position where it remains for a predetermined period.

24. The combination of a motive fluid generator including a burner, a fuel feed mechanism therefor having an oil well, a dome valve adapted to occupy a position to prevent the entrance of the oil from the well, a pressure priming fluid reservoir adapted to supply fluid through the dome valve to the feed mechanism thereby moving the dome valve by virtue of the pressure, and means for intercepting the dome valve upon being returned by the resulting explosion of the priming fluid and thereby establishing communication with the oil well for subsequent ignition at the burner.

25. The combination of a motive fluid generator including a burner, fuel feed mechanism therefor having an ignition chamber and an oil well, a dome valve having a port adapted to be out of communication with the oil well and having spray apertures, a butterfly valve controlling communication between the burner and ignition chamber, connecting means between the butterfly and dome valves, means to deliver priming fluid under pressure to the dome valve moving it to close the butterfly valve and supply a fluid spray to the ignition chamber, and means adapted to intercept the dome valve when it returns upon explosion of the priming fluid thereby establishing communication of the oil well through said port to the burner through the then open butterfly valve.

26. The combination of a motive fluid generator burner, fuel feed mechanism therefor having an ignition chamber and an oil well with a port, a dome valve having a corresponding port adapted to be out of registration with the oil well port, a butterfly valve controlling communication between the burner and ignition chamber, connecting means between the butterfly and dome valves, means to supply priming fluid to the dome valve under pressure thereby raising said valve and closing the butterfly valve, said ports again moving out of registration, and means, including a weight-actuated pin, adapted to move into a position to intercept the dome valve upon explosion of the priming fluid in the ignition chamber thereby holding said ports in registration to supply the burner with oil from the well.

27. Apparatus of the character described comprising the combination of a combustion chamber one end of which is water jacketed, a burner situated in the jacketed end and discharging into the chamber, water conducting means situated entirely within the combustion chamber connecting with the water jacket at one end and terminating at the opposite end of said chamber, means at said end for releasing steam formed in said conducting means by the surrounding heat, an engine to utilize the motive fluid provided by said conducting means and the burner, and a pipe in which the constituents of said motive fluid commingle connecting the combustion chamber with the engine.

28. Apparatus of the character described comprising the combination of a combustion chamber one end of which is water jacketed, a burner situated in the jacketed end and discharging into the chamber, water conducting means situated entirely within the combustion chamber connecting with the water jacket at one end and terminating at the opposite end of said chamber, means at said end for releasing steam formed in said conducting means by the surrounding heat, an engine to utilize the motive fluid provided by said conducting means and the burner, a pipe in which the constituents of said motive fluid commingle connecting the combustion chamber with the engine, a compressed air jacket surrounding the combustion chamber, and means to conduct air from said jacket to the burner to support combustion.

29. A motive fluid generator comprising a combustion chamber having an inlet and outlet, a mixing chamber at the outlet of the combustion chamber, a water jacket around the inlet of the combustion chamber, an air jacket surrounding the combustion chamber, fuel feed mechanism situated at said inlet and having a duct leading from the fuel feed mechanism to the air jacket, means for forcing air into the air jacket at the end adjacent the combustion chamber outlet toward the inlet end thereof, through the fuel feed mechanism to spray the fuel, support combustion and traverse the combustion chamber in a direction opposite to that of the air, a pipe located in the combustion chamber leading from the water jacket and terminating at the mixing chamber, and a valve at the terminal of said pipe having thermostatic means adapted to control the discharge of steam generated in said pipe into the mixing chamber where it commingles with the products of combustion of the fuel feed mechanism.

MILTON EUGENE BIGELOW.